US005355513A

United States Patent [19]
Clarke et al.

[11] Patent Number: 5,355,513
[45] Date of Patent: Oct. 11, 1994

[54] TRANSPONDER WITH REPLY FREQUENCY DERIVED FROM FREQUENCY OF RECEIVED INTERROGATION SIGNAL

[75] Inventors: David J. Clarke, Bramford, England; Edward A. Martin, Sunnyvale, Calif.

[73] Assignee: Schlumberger Industries Limited, Farnborough, England

[21] Appl. No.: 635,066

[22] Filed: Dec. 28, 1990

[30] Foreign Application Priority Data

Dec. 29, 1989 [GB] United Kingdom ............... 8929322.9

[51] Int. Cl.⁵ .............................................. H04B 7/15
[52] U.S. Cl. ........................................ 455/20; 455/23; 455/76; 340/870.02
[58] Field of Search ...................... 455/15, 18, 70, 75, 455/76, 68, 69, 260, 265, 119, 20, 66, , 21, 23, 86, 87; 340/825.54, 572, 870.02; 379/106

[56] References Cited

U.S. PATENT DOCUMENTS

| | | | |
|---|---|---|---|
| 4,214,205 | 7/1980 | Guest | 455/20 |
| 4,274,083 | 6/1981 | Tomoeda | 340/572 |
| 4,339,826 | 7/1982 | Ogita et al. | 455/183.1 |
| 4,513,447 | 4/1985 | Carson | 455/76 |
| 4,614,945 | 9/1986 | Brunius et al. | 455/105 |
| 4,862,514 | 8/1989 | Kedjierski | 455/20 |
| 5,115,515 | 5/1992 | Yamamoto et al. | 455/76 |

*Primary Examiner*—Reinhard J. Eisenzopf
*Assistant Examiner*—Chi Pham
*Attorney, Agent, or Firm*—Sanford J. Asman

[57] ABSTRACT

A transponder includes a receiver for receiving a radio interrogation signal. The transponder also includes a phase locked loop decoder for deriving a reference signal from the received interrogation signal, and a radio transmitter for transmitting a transponder reply signal. The phase locked loop has an output which feeds the AC reference signal to the transmitter. The transmitter includes a frequency doubler which generates a transmitter radio frequency at double the frequency of the reference signal. The transmitter radio frequency is therefore controlled by the radio frequency of the interrogation signal. The phase locked loop includes a divide-by-N counter, where N is a predetermined integer parameter. The parameter N determines the derivation of the reference signal frequency from the interrogation signal frequency.

9 Claims, 2 Drawing Sheets

TRANSPONDER WITH REPLY FREQUENCY DERIVED FROM FREQUENCY OF RECEIVED INTERROGATION SIGNAL

BACKGROUND OF THE INVENTION

The present invention relates to the field of transponders, and is more particularly but not exclusively concerned with transponders suitable for incorporation in commodity meters for use in transmitting the meter reading or readings to a passing meter reading vehicle.

A conventional transponder includes a receiver for receiving a radio interrogation signal, and a transmitter for transmitting a reply signal in response to the interrogation signal.

SUMMARY OF THE INVENTION

According to the present invention, there is provided transponder apparatus for transmitting a radio reply signal in response to a radio interrogation signal, comprising radio receiver means for receiving the interrogation signal, decoder means for deriving a reference signal from the interrogation signal, the decoder means including an oscillator and means for controlling the oscillator to generate the reference signal at a frequency dependent on the frequency of the received interrogation signal and offset therefrom by a predetermined offset value, and radio transmitter means for transmitting a reply signal at a radio frequency derived from the reference signal.

With such a transponder, the transmitter reply frequency can be controlled by interrogation apparatus. Preferably, the decoder means derives an A.C. reference signal, and the transmitter means transmits the reply signal at a radio frequency derived from the frequency of the reference signal. The transmitter may include a frequency multiplier coupled to a transmitter antenna, the reference signal being supplied to the input of the frequency multiplier, and the transmitter radio frequency being an integer multiple of the frequency of the reference signal.

Preferably, the decoder means includes a phase locked loop circuit, which circuit includes a variable frequency oscillator for deriving the reference signal. The phase locked loop circuit may be part of the receiver means. With such an arrangement, the transmitter means does not need to include a powerful radio frequency oscillator set up to produce an accurately defined frequency output. The phase locked loop allows the use of an oscillator that is automatically locked to the correct frequency dependent on the interrogation signal. The accuracy of transmitter frequency can then be close to the accuracy of the interrogation signal frequency.

The present invention also provides a method of controlling a transponder by means of a radio interrogation signal, comprising receiving the interrogation signal, deriving a reference signal from the interrogation signal, and transmitting a radio reply signal in response to the interrogation signal and at a radio frequency determined by the reference signal.

In another aspect, the invention provides radio receiver means for use in a transponder apparatus, for receiving a radio interrogation signal, said receiver means including an intermediate frequency signal stage comprising first and second intermediate frequency amplifiers, first and second signal demodulators, and a summing circuit, the output from the first intermediate frequency amplifier being connected to the input of the second intermediate frequency amplifier and to the input of the first signal demodulator, and the output from the second intermediate frequency amplifier being connected to the input of the second signal demodulator, the outputs from the signal demodulators being connected to the input of the summing circuit, whereby, in use, the output signal from the summing circuit is the demodulated received radio signal.

Preferably, the demodulators are AM demodulators. The demodulators may be used only for the reception of a "wake-up" signal that triggers the transponder into operation to transmit its reply. If the received signal is strong, it is possible that the second demodulator will become overloaded. However, the circuit can be arranged such that the first demodulator is never overloaded. The demodulator outputs are summed algebraically in the summing circuit, and the second demodulator can improve performance in the case of weak signal reception.

BRIEF DESCRIPTION OF THE DRAWING

An embodiment of the invention will now be described by way of example with reference to the accompanying drawings, in which.

DETAILED DESCRIPTION OF THE PREFERRED EMBODIMENT

Figure 1:
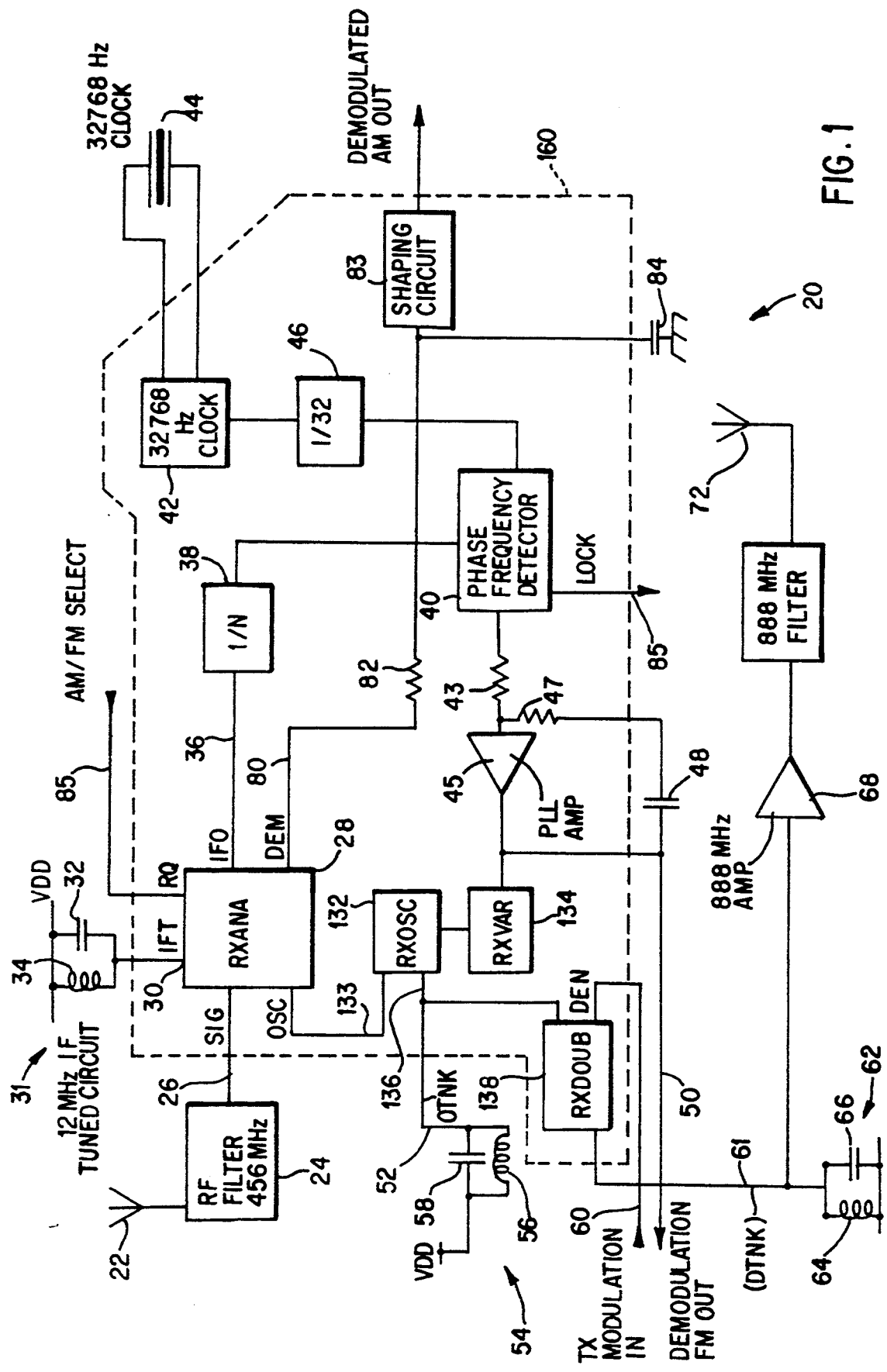
FIG. 1 is a block diagram showing a transponder in accordance with the present invention.

Referring to FIG. 1, a transponder circuit 20 includes a receiving antenna 22 for receiving a radio frequency (RF) interrogation signal from an interrogation apparatus (not shown). The receiving antenna 22 is connected through an RF filter 24 tuned to allow the predetermined frequency of the interrogation signal to pass and to cut out other signals. In the present embodiment, the frequency of the interrogation signal is 456 MHz, and the RF filter 24 is tuned to a centre pass frequency of 456 MHz.

The output from the filter 24 is connected to a signal input (SIG) 26 of a radio receiver (RXANA) 28. The receiver 28 can demodulate received AM or FM signals, and has an AM/FM selector input (HQ) 85 which controls demodulation operation of the receiver 28. When the selector input 85 is active, FM demodulation is selected. The selector input 85 also controls a number of parameters within the receiver. The opertaion and internal circuitry of the receiver 28 is described in more detail hereinafter.

The receiver 28 has an intermediate frequency (IF) input (IFT) 30 which is fed from a tuned circuit 31 formed by a capacitor 32 connected in parallel with an inductor 34. The tuned circuit 31 provides a reactive load for an IF generated within the receiver 28 and is tuned to a centre frequency of 12 MHz.

The receiver 28 also has an IF output (IFO) 36 which is the amplified IF generated within the receiver. The IF output is connected to a frequency divider 38. The divider 38 has an external control parameter N (not shown) which controls the divider 38 to divide the frequency by the integer value N.

The output from the divider 38 is connected to one input of a phase/frequency detector 40. A clock circuit comprising a clock oscillator 42 with an associated crystal 44, and a divide-by-32-clock-counter 46 is connected to another input of the phase/frequency detector 40. In use, the clock oscillator 42 generates a 32768 Hz signal which is divided in frequency by 32 at the counter 46 to produce an approximately 1 kHz clock input to the phase/frequency detector 40.

The output from the phase/frequency detector 40 is coupled through a filter resistor 43 to an input of a phase locked loop (PLL) amplifier 45. A further PLL filter resistor 47 is connected in series with a PLL filter capacitor 48 between the input and output of the PLL amplifier 45 to act together with the resistor 43 as a PLL filter. The output from the PLL amplifier 45 is connected to a Varactor 134. The output from the Varactor 134 is connected to the control input of a variable radio frequency oscillator (RXOSC) 132 having a first output connected to an oscillator input (OSC) 133 of the receiver 28. The oscillator 132 has a second output 136 connected to a tuned circuit 54 formed by an inductor 56 and a capacitor 58 connected in parallel. The tuned circuit 54 provides a reactive load for generating a reference signal in the oscillator 132, and is tuned to a centre frequency of 444 MHz. The reference signal is used for controlling the transmitter frequency of the transponder reply, as described hereinafter. In use, the output signals supplied to the first and second oscillator outputs 133 and 136, respectively, are of the same frequency, which frequency is the reference signal.

The second oscillator output 136 is also connected to the input of a frequency multiplier in the form of a frequency doubler 138. The doubler 138 has a second input 60 connected as a transmitter modulation input (DEN), connected to the output of a circuit (not shown) for generating a reply message to be encoded in the reply signal by modulation. The output (DTNK) 61 from the doubler 138 is to a tuned circuit 62, comprising an inductor 64 connected in parallel with a capacitor 66, and is tuned to a centre frequency of 888 MHz (i.e. 2×444 MHz). In use, the reference signal is supplied to the doubler, which in turn generates an RF transmitter frequency of twice that of the reference signal. The PLL forms part of the receiver and also a decoder for deriving the reference signal from the received interrogation signal. The output from the PLL amplifier also provides a FM demodulated output 50, which in use outputs a control signal which is encoded in the interrogation signal by frequency modulation. This control signal is used to control the transponder as is described hereinafter.

The output (DTNK) 61 is also connected to the input of an R.F. transmitter amplifier 68, which is tuned to the centre frequency of the tuned circuit 62, i.e. 888 MHz. The output from the transmitter amplifier 68 is connected through an R.F. filter 70 tuned to allow signals of around 888 MHz to pass through, to a transmitter antenna 72 for transmitting the transponder reply signal. The doubler 138, the amplifier 68, the filter 70 and the antenna 72 together form a transmitter.

In use, the radio frequency of the transmitted reply is near 888 MHz, but its precise value is determined by the reference signal derived in the receiver 28.

The receiver 28 also has an AM demodulated output (DEM) 80 connected through a filter resistor 82 to an input of a shaping circuit 83. An associated filter capacitor 84 is connected between the input of the shaping circuit 83 and ground. In use, the receiver 28 is initially in a dormant state, in which AM demodulation is selected by means of control logic (not shown). When an interrogation signal is first received, the receiver 28 decodes an AM "wake-up" signal present in the interrogation signal. The control logic responds the decoded "wake-up" signal to switch the transponder from the dormant state to a semi-active state. In the present embodiment the wake-up signal is 32.5 Hz amplitude modulation of the 456 MHz interrogation signal. The filter resistor 82 and the filter capacitor 84 behave as a low-pass filter to pass the 32.5 Hz wake-up signal. The wake-up signal is shaped by the shaping circuit 83 to a shape suitable for detection by the control logic (not shown) to switch the transponder between the dormant and semi-active states.

When the wake-up signal is detected the transponder is triggered into the semi-active state, and the selector input 85 is set by the control logic to select FM demodulation to detect a control signal in the interrogation signal. The control signal is PM modulation of the 456 MHz interrogation carrier, at a frequency of 32.5 SHz. In the semi-active state, the receiver 28, the divide by N counter 38, the phase/frequency detectgor 40, the PLL amplifier 45, the varactor diode 134 and the voltage controlled oscillator 132 become operative to form a phase locked loop (PLL). The phase/frequency detector 40 has a LOCK output 85, which provides a logical signal indicative of the state of the PLL. The output 85 produces an "in-lock" signal when the PLL is properly locked. The control logic responds to the "in-lock" signal to switch the transponder form the semi-active state to the active state. In the active state, the control logic controls the transponder to transmit its reply signal. On termination of reception the control signal, the control logic returns the transponder to the dormant state, with the selector input 85 set to AM demodulation.

In the semi-active state, FM demodulation is selected to detect the control signal in the interrogation signal, but the transponder is prevented from entering the active state (in which it transmits its reply) until the PLL has become properly locked. The active state is only permitted if the control signal is being detected and the PLL is in lock.

Figure 2:
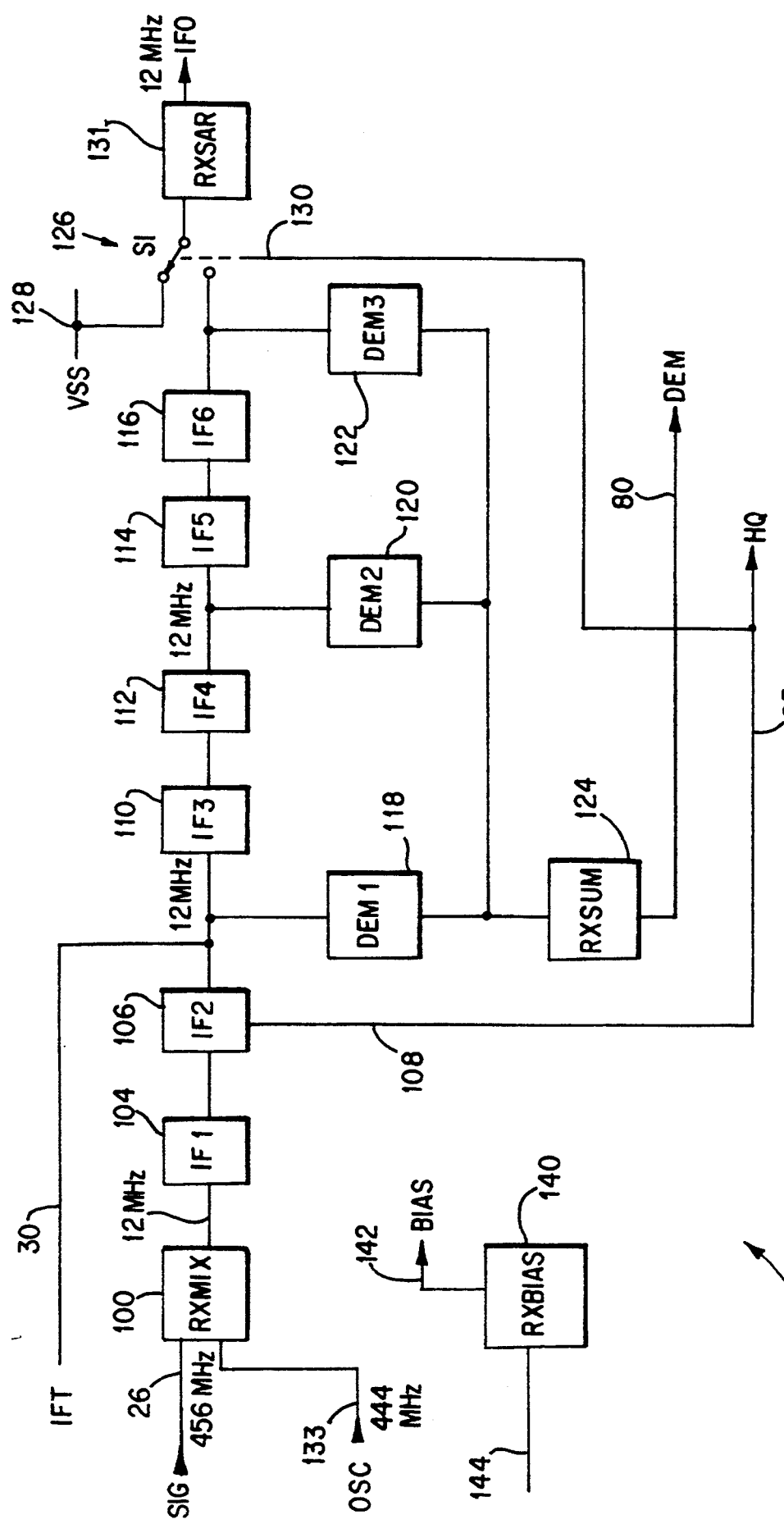
FIG. 2 is a block diagram showing in greater detail a feature of FIG. 1.

Referring to FIG. 2, the receiver 28 includes an R.F. mixer (RXMIX) 100 comprising a multiplier having an input connected as the signal input (SIG) 26 of the receiver 28, and a second input (OSC) 133 connected to the oscillator 132 (FIG. 1). The output from the RF mixer 100 is connected to the input of a first IF amplifier (IFI) 104. The IF amplifier 104 has a fixed gain of approximately 12 dB and a bandwidth of 4 to 14 MHz.

The output from the first IF amplifier is connected to the input of a second IF amplifier (IF2) 106. The second IF amplifier has a switchable Q, under the control of a Q-select input 108 connected as the AM/FM selector input (HQ) 85 of the receiver 28. When the selector input 85 is set to AM, the second IF amplifier 106 is set to low Q, and when the selector input 85 is set to FM, the second IF amplifier 106 is set to high Q. At low Q, the IF amplifier has a gain of approximatgely 6 dB with a bandwidth of 10 MHz. At high Q the IF amplifier has a gain of approximately 15 dB with a bandwidth of 300 KHz. The function of the Q switching is described hereinafter.

The output from the second IF amplifier 106 is connected to the input of a third IF amplifier (IF3) 110 connected in cascade to a fourth IF amplifier (1F4) 112. The output from the fourth amplifier 112 is connected to the input of a fifth IF amplifier (IF5) 114 connected in cascade to a sixth IF amplifier (IF6) 116. The third, fourth, fifth and sixth IF amplifiers 110, 112, 114, 116, respectively, are each similar to the first IF amplifier 104.

The output from the second IF amplifier is connected also to the input of a first AM demodulator (DEM 1) 118. The output from the fourth IF amplifier 112 is connected also to a second AM demodulator (DEM2) 120. The oputput from the sixth IF 116 amplifier is connected to the input of a third AM demodulator (DEM3) 122. The outputs from the first, second and third AM demodulators are connected to inputs of a resistive summing circuit (RXSUM) 124. The summing circuit has an output equal to the algebraic sum of the outputs from the AM demodulators, and its output is connected as the AM demodulated output (DEM) 80 of the receiver 28.

The output from the sixth IF amplifier 116 is connected to one terminal of an electronic selector switch (S1) 126. The other terminal of the switch 126 is connected to a constant voltage source (VSS) 128. The switch has a control input 130 connected to the Q-select input (AM/FM selector) 108. When the selector input 108 is set to AM, the switch 126 is set to select the constant voltage input, and when the selector input is set to FM, the switch 126 is set to select the output from the sixth IF amplifier 116. The pole of the selector switch 126 is connected to the input of a square-wave shaping circuit (RXSQR) 131. The output from the shaping circuit is connected as the IF output (IFO) 36 from the receiver 28.

A bias voltage generator 140 is also included in the receiver 28. The bias voltage generator 140 is connected by means of a bias line 142 to each of the sections of the receiver 28. In use, the generator 140 supplies a bias voltage to each of the sections of the receiver to bias correctly semiconductor components in the receiver. The value of the bias voltage is controlled by a bias input (VBS) 144 of the bias generator 140.

Referring to FIGS. 1 and 2, in use the control logic (not shown) controls the supply of power to the different sections of the transponder.

Before an interrogation signal is received, the transponder will be in the dormant state. In this state, no power is supplied to the transmitter amplifier 68, nor to the circuit for generating a reply message to be encoded in a reply signal. Power is supplied to the remaining circuits intermittently. In the present embodiment, the intermittent power is supplied for 1 msec per second. The transponder will therefore be able to receive a wake-up signal for 1 msec every second.

The AM/FM selector input 85 is set to AM to detect the occurrance of a wake-up signal. The switch 126 is therefore set to the constant voltage source 128 whereby the square wave shaping circuit 131 has a continuous voltage input and therefore consumes little power.

With the AM/FM selector input 85 set to AM, the second IF amplifier is set to the low-Q mode. In this mode, the receiver has a broad bandwidth to allow reception of an imprecise IF frequency generated by free running of the voltage controlled oscillator 133. The voltage controlled oscillator frequency is determined by the tuned circuit 54, i.e. approximately 444 MHz.

As explained hereinbefore, the wake-up signal is a radio-frequency signal of 456 MHz with amplitude modulation at 32.5 Hz. When the 456 MHz interrogation signal is received by the receiver, the 456 MHz signal is mixed at the RF mixer 100 with the 444 MHz output signal from the voltage controlled oscillator 132, thereby producing an intermediate frequency of 12 MHz. Modulation of the 456 MHz signal is carried through the RF mixer 100 as modulation of the 12 MHz IF signal.

The IF signal is amplified by the first to sixth IF amplifiers 104 to 116 respectively, and the AM wake-up signal is demodulated by any of three AM demodulators 118, 120, 122. The outputs from the AM demodulators are summed at the summing circuit 124, and then filtered by the 32.5 Hz filter capacitor 84 and filter resistor 82, and shaped by the shaping circuit 83. It is possible that the AM signal is so strong that the third demodulator 122 and perhaps the second demodulator 120 become overloaded. An overloaded demodulator may not respond to the modulation but this does not detract from operation of the receiver, since the outputs from the demodulators are algebraically summed at the summing circuit 124. Only one of the demodulators needs to be operative and the receiver characteristics are chosen so that the first demodulator 118 will never be overloaded. Demodulation linearity is not necessary to detect the wake-up signal. The filtering and shaping of the demodulated output ensures that all that is required is a signal comprising pulses at a frequency of 32.5 Hz.

Once the control logic has recognised the wake-up signal, continuous power is supplied to all circuits in the transponder. The AM/FM selector input 85 is set to FM so that detection of the wake-up signal is no longer necessary. With the AM/FM selector input 85 set to FM, the second IF amplifier 106 is switched to the high Q mode. In this mode, the receiver has a narrower bandwidth than in the AM mode, thereby reducing noise, but the IF gain is greater allowing increased range. Together the narrower bandwidth and higher gain of the FM mode allow increased capability of retaining lock of the PLL. The switch 126 is set to select the output from the sixth IF amplifier 116 for the input to the shaping circuit 131.

The PLL is formed by the RF mixer 100, the first to sixth IF amplifiers 104 to 116, the square wave shaping circuit 131, the divide by N counter 38, the phase/frequency detector 40, the PLL amplifier 45, the varactor diode 134 and the voltage controlled oscillator 132. The clock frequency supplied from the clock oscillator 42 to the phase/frequency detector is 1 KHz, therefore the dominant signal in the IF amplifiers will be N×1 KHz. If the external parameter N is selected to be 12000 (typically the value of the IF generated), and the dominant signal is the 456 MHz interrogation signal, then the oscillator 132 will be locked and running at 444 MHz (i.e. 456 MHz − 12 MHz). Thus the reference signal is a stable frequency signal, of frequency 444 MHz. The reference signal is available for doubling by the doubler 138, but the operation of the doubler is subject to 100% pulse modulation from the T/x input 60. The output from the doubler is amplified by the transmitter amplifier 68 and fed to the transmitter antenna 72 for transmitting as the transponder reply signal.

The control signal, i.e. the 32.5 Hz frequency modulation of the 456 MHz interrogation signal is detected on the output 50 from the PLL amplifier 45.

The control logic (not shown) ensures that the transmitter is not enabled (i.e. the active stgate entered) if either the PLL is out of lock, or the 32.5 Hz control signal is not being received at the FM output 50.

In order to adjust the frequency of the reference signal ("frequency hopping"), the external control parameter N of the divider 38 can be varied. For example, decreasing N by one, from 12000 to 11999, forces the dominant IF frequency to 11.999 MHz by causing the PLL to adjust the oscillator 132 to run at 444.001 MHz. This produces a transmitter frequency of 888.002 MHz.

It will be appreciated that in the embodiment described, the transmitting frequency of the transponder reply is controlled by the radio frequency of the interrogation signal, the 32768 Hz crystal clock generator and the ratios of two frequency dividers. The precision of the transmitting frequency is close to that of the interrogation signal carrier because the accuracy of the 32768 Hz clock is well known to be high, and the frequency dividers are merely integer modulus counters. An accurately defined interrogation frequency therefore produces an accurately defined reply frequency. This is achieved without using an accurately variable frequency transmitter oscillator in the transponder, which would be expensive. The present embodiment uses a relatively cheap fixed frequency digital clock, and a varactor controlled oscillator. In effect, the transponder is using an oscillator present in the interrogation apparatus to obtain an accurate frequency locked signal. Thus the precision and control of the reply frequency is derived from the interrogation apparatus. The frequency stability of the reference oscillator in the transponder is not critical since it will automatically lock on to the desired frequency.

It will also be appreciated that by varying the parameter N, the transponder can be set to transmit its reply at one of a band of predetermined frequencies (the predetermined frequencies each being dependent on the interrogation frequency).

The embodiment described above allows the precise definition of a reply frequency Fr using a received interrogation frequency Fi by generating a reference frequency f such that Fi-f is small compared to both Fi and Fr. In the embodiment described above (with N=12000), f equals 444 MHz, and the values of Fi and Fr are 465 MHz and 888 MHz, respectively. Also f=Fr/m, where m=a small integer value. Use of this technique allows precise definition of Fr without the need for accurate temperature control of the clock oscillator 42, which would be expensive. The technique reduces the error contribution in Fr caused by errors in the frequency of the oscillator 42 by a factor of (Fi−f)/Fr.

Additionally the use of a relatively low intermediate frequency, about 12 MHz in the embodiment described above, and a low frequency entering the programmable divider 38, reduces the power consumption of the transponder.

It will also be appreciated that in the present embodiment, the transponder consumes only a small amount of power in the dormant state, and only consumes full power once it is in the active state. In the embodiment described, most of the circuit elements can be miniaturised, and their power consumption can be small. Referring to FIG. 1, all of the elements shown within the dotted line 160 are suitable for implementation as a single integrated circuit.

A transponder of the type of the embodiment is suitable, for example, for use in remote, or automatic, reading of measuring instruments. In one example, commodity meters such as domestic gas, water or electricity meters are equipped with the transponders, the reply message of each transponder being the current reading of the respective meter. The transponders are arranged to reply to a common wake-up signal, but they are preset to transmit on different relative frequency bands, by having different values of the parameter N.

To interrogate the meter transponders, a vehicle carrying suitable interrogation apparatus can drive near the homes containing the meters, and can interrogate all of the meters within transmitting range simultaneously. The vehicle must contain suitable apparatus for receiving the reply messages on the different frequency bands. By having a sufficiently accurate interrogation transmitter e.g. capable of transmitting at a precisely defined ratio frequency ±2.5 kHz, the transponders can be arranged to transmit their replies at 25 kHz channels with an accuracy of 2.5 kHz, as required by the U.K. licensing authority.

Although in the present embodiment, a frequency doubler is used in the transmitter, other embodiments may use other integer frequency multipliers. Depending on the design of the frequency multiplier, the transmitter amplifier may be incorporated within the frequency multiplier, or it may possibly be omitted altogether.

We claim:

1. Transponder apparatus for transmitting a radio reply signal in response to a radio interrogation signal, comprising:
   (a) radio receiver means for receiving said radio interrogation signal, said radio receiver means including:
      (i) an antenna for receiving said radio interrogation signal;
      (ii) a mixer; and
      (iii) an intermediate frequency amplifier coupled to the output of the mixer; and
   (b) decoder means for deriving a reference signal from said radio interrogation signal, said decoder means being coupled to the output of the intermediate frequency amplifier and including:
      (i) an oscillator;
      (ii) phase locked loop means for controlling said oscillator to generate the reference signal at a frequency dependent on the frequency of received radio interrogation signal and offset therefrom by a predetermined offset value; and
   (c) radio transmitter means for transmitting a reply signal at a radio frequency derived from said reference signal but different from said radio interrogation frequency, said predetermined offset value being very much smaller than the radio interrogation frequency and the radio reply frequency,
said mixer having inputs comprising said radio interrogation signal from said antenna and the output from said oscillator, whereby said mixer generates an intermediate frequency for application to said intermediate frequency amplifier, said phase locked loop further including a divide-by-N counter coupled to the output of the intermediate frequency amplifier and a phase/frequency detector, said phase/frequency detector having one input connected to the output from said divide-by-N counter and a second input connected to a clock circuit, the parameter N determining said predetermined offset value.

2. Transponder apparatus according to claim 1, wherein the transmitter means includes a frequency multiplier coupled to a transmitter antenna, the reference signal being supplied to the input of the frequency multiplier, and the transmitter radio frequency being an integer multiple of the frequency of the reference signal.

3. Transponder apparatus according to claim 2, wherein the frequency multiplier includes a modulator for encoding a reply message from the transponder into the reply signal.

4. Transponder apparatus according to claim 2, wherein the frequency multiplier is a frequency doubler.

5. Transponder apparatus according to claim 1, wherein the decoder means derives a reference signal of frequency determined by the radio carrier frequency of the interrogation signal.

6. Transponder apparatus according to claim 1, wherein the transponder is switchable between an active state in which the reply signal is transmitted, and a dormant state in which the reply signal is not transmitted, the interrogation signal containing a wake-up signal and a control signal, the transponder including control means for detecting the wake-up signal and subsequently switching the transponder from the dormant to the active state, and for maintaining the transponder in the active state until termination of the control signal whereupon the transponder is returned to the dormant state.

7. Transponder apparatus according to claim 1 further comprising:

(a) means for connecting said apparatus to a commodity supply meter; and (b) means for encoding the reply signal from said apparatus to include a reply message indicative of the reading of said meter.

8. Transponder apparatus for transmitting a radio reply signal in response to a radio interrogation signal, comprising radio receiver means for receiving the interrogation signal, decoder means for deriving a reference signal from the interrogation signal, the decoder means including an oscillator and means for controlling the oscillator to generate the reference signal at a frequency dependent on the frequency of the received interrogation signal and offset therefrom by a predetermined offset value, and radio transmitter means for transmitting a reply signal at a radio frequency derived from the reference signal, said transponder being switchable between an active state in which the reply signal is transmitted, and a dormant state in which the reply signal is not transmitted, the interrogation signal containing a wake-up signal a control signal, the transponder including control means for detecting the wake-up signal and subsequently switching the transponder from the dormant to the active state, and for maintaining the transponder in the active state until termination of the control signal whereupon the transponder is returned to the dormant state, wherein the wake-up signal is AM modulation of the interrogation signal, and the control signal is FM modulation of the interrogation signal, and wherein the receiver includes an AM demodulator for receiving the wake-up signal, and an FM demodulator for receiving the control signal.

9. Transponder apparatus according to claim 8, wherein the receiver includes a phase locked loop, the transponder being switchable to a semi-active state in which the FM demodulator is enabled with the transmitter means disabled, in use, the control means switching the transponder from the dormant to the semi-active state on reception of the wake-up signal, and subsequently switching the transponder from the semi-active state to the active state when the phase locked loop becomes locked.

* * * * *